Nov. 7, 1950         W. H. WEIMER         2,529,205
MACHINE TOOL CHUCK

Original Filed Sept. 18, 1942         3 Sheets-Sheet 1

INVENTOR
WILLIAM H. WEIMER
BY Christopher L. Naal
ATTORNEY

Nov. 7, 1950 W. H. WEIMER 2,529,205
MACHINE TOOL CHUCK
Original Filed Sept. 18, 1942 3 Sheets-Sheet 3

INVENTOR
WILLIAM H. WEIMER
BY Christopher L. Naal
ATTORNEY

Patented Nov. 7, 1950

2,529,205

UNITED STATES PATENT OFFICE 2,529,205

MACHINE TOOL CHUCK

William H. Weimer, North Prairie, Wis., assignor to Davis & Thompson Company, West Allis, Wis., a corporation of Delaware Original application September 18, 1942, Serial No. 458,839, now Patent No. 2,424,524, dated July 22, 1947. Divided and this application December 4, 1943, Serial No. 512,943

4 Claims. (Cl. 279—57)

The present invention relates to machine tools such as boring machines and the like, and more particularly to chucking means adapted for holding work which is to be subjected to tool operations.

An object of the invention is to provide an improved chucking means for accurately and expeditiously positioning and clamping work of generally cylindrical shape.

Another object is to provide a chucking means by which tubular articles may be firmly clamped without distortion of the article walls.

Still another object is to provide article-chucking means which will facilitate insertion and removal of the articles.

A further object is to provide a chucking means having an improved rotatable mounting and drive.

A still further object is to perfect details of construction generally.

The invention further consists in the several features hereinafter described and claimed.

In the accompanying drawings.

Figure 1:
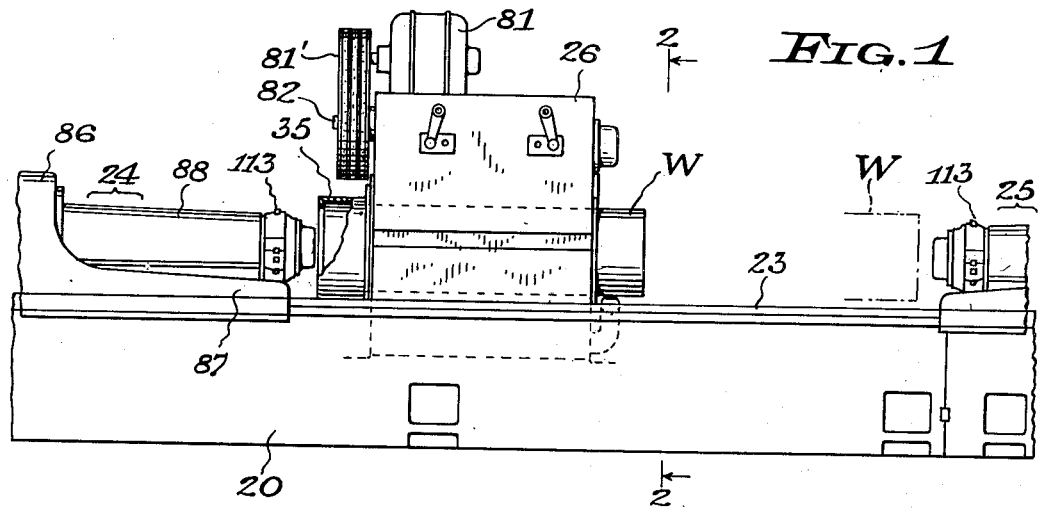
Fig. 1 is a front elevation of a boring machine provided with chucking means constructed in accordance with the invention, parts of the chucking means being shown in section, and opposed boring heads of the machine being shown in retracted position in readiness to operate on a work piece rotatably carried by the chucking means.

In the drawings, 20 designates an elongated bed or base frame which is provided along its upper front and rear portions with longitudinally extending horizontal guideways 23 arranged in parallel relation. Mounted on an intermediate portion of the frame and between the guideways is an upstanding stationary housing 26 provided with means hereinafter described for chucking a tubular work piece W which is rotatable on a horizontal axis parallel to the guideways 23. The work piece W may have various forms but it is here shown to be a metal tube open at both ends and having a cylindrical outer surface. Preferably, this outer surface is ground or otherwise machined before the tube is mounted in the chucking means.

Slidably mounted on the guideways are two opposed reciprocatory boring heads designated generally by 24 and 25. Each boring head comprises a suitably actuated carriage 86 resting on the guideways and provided with spaced arms 87 extending along the guideways to insure stability, these arms being adapted to straddle the chuck housing 26 during the travel of the carriage. Rigidly secured to the carriage is a forwardly projecting tubular boring bar 88 which extends coaxially of the mounted tubular work piece and is adapted to enter the work piece. One or more cutter bits 113 are mounted on the front end of the boring bar and are suitably controlled to vary the cutting radius.

Figure 3:
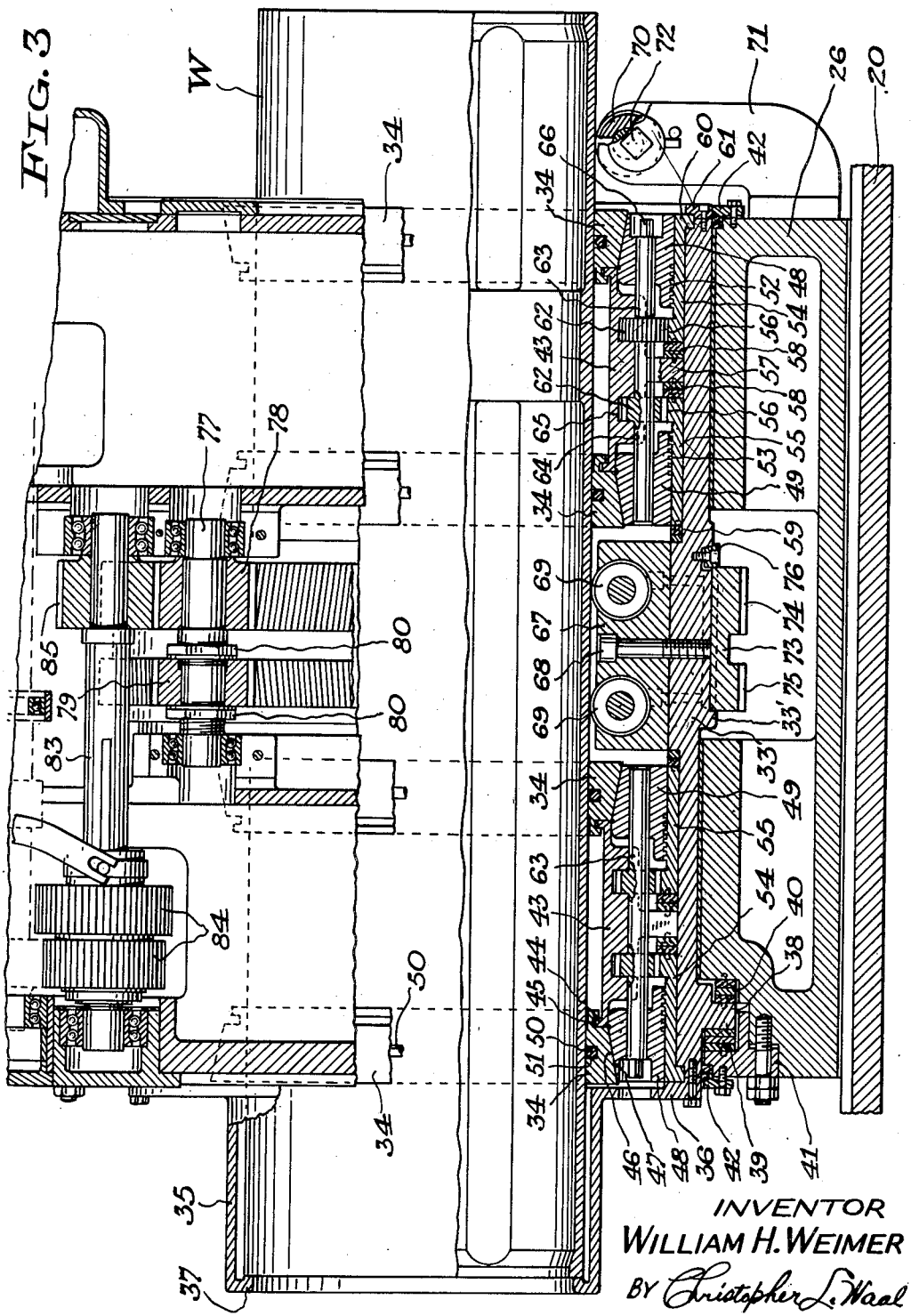
Fig. 3 is a sectional elevation taken generally along the line 3—3 of Fig. 2, a work piece being mounted in the chucking means.
Figure 4:
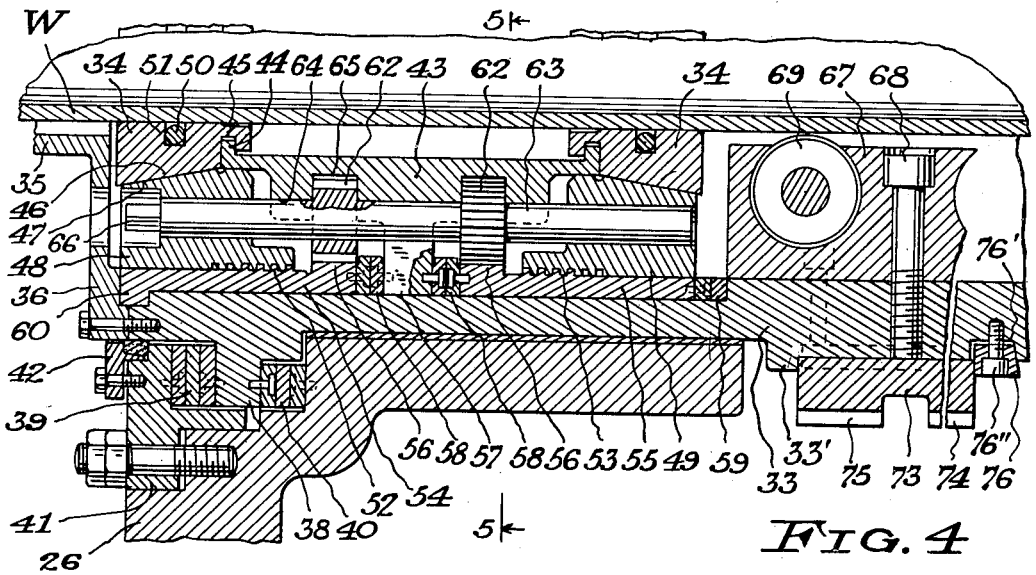
Fig. 4 is a sectional elevation of a portion of the chucking means on a larger scale, taken on the same plane as Fig. 3.
Figure 6:
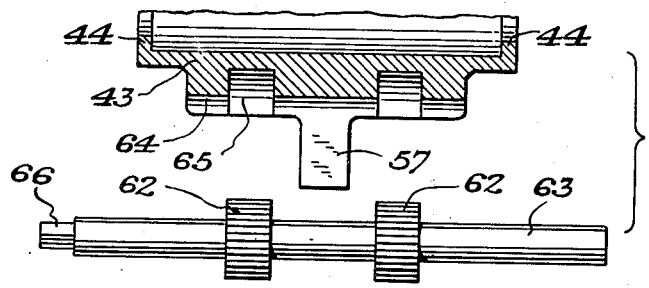
Fig. 6 is a detail sectional view of parts of the chucking means.
Figure 5:
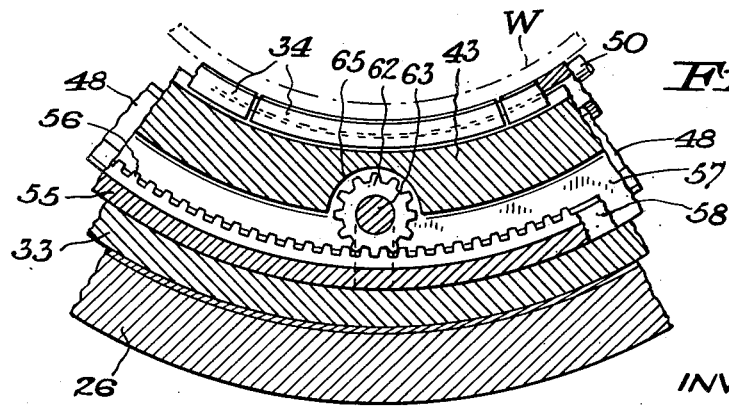
Fig. 5 is a transverse sectional elevation taken generally along the line 5—5 of Fig. 4.

The work chucking means includes a hollow or tubular power-driven shaft or spindle 33 journalled in the housing 26 to rotate about a horizontal axis parallel to the guideways 23. The shaft carries therein axially spaced sets of arcuate or segmental work-clamping jaws 34 which are adjustably mounted as hereinafter described to form two collet chucks at opposite end portions of the shaft. The tubular work piece is insertible into the hollow shaft 33 so as to project from opposite ends of the housing 26, the work piece being insertible from one end of the housing and being axially positioned by an annular stop or gage member 35 at the other end of the housing. As seen in Fig. 1, the right-hand boring head 25, in its retracted position, is spaced a sufficient distance from the chuck housing to permit insertion and removal of the work piece. The gage member 35, which surrounds the inserted work piece, has an outturned flange 36 rigidly secured to the end of the hollow shaft 33 to rotate with the shaft, and has an inturned stop flange 37 at its outer end engageable with the end of the work piece. The work-rotating shaft 33 is provided near one end with an outwardly projecting flange 38, Fig. 3, laterally engageable with thrust washers 39 and 40 to prevent axial play of the shaft, the flange and thrust washers being confined by a ring member 41 secured to the housing 26. Oil seals 42 are provided at opposite ends of the shaft.

The chuck jaws 34 are arranged in the hollow shaft 33 in axially spaced sets, four sets of jaws being shown in the present instance and forming parts of two chuck assemblies each having two spaced sets of jaws. The two series of jaws for each chuck assembly are held in axially spaced relation by a guide ring or connector ring 43 concentric with the shaft, the guide ring having inturned annular flanges 44 at opposite ends slidably extending into peripheral grooves 45 formed in the jaws. The jaws have tapered outer surfaces 46 bearing on correspondingly tapered inner surfaces 47 of wedge rings 48 and 49, the jaws in each set being urged radially outwardly against the associated wedge ring by a resilient expansion ring 50 fitting in aligned grooves 51 formed in the inner cylindrical surfaces of the jaws. The two wedge rings 48 and 49 of each chuck assembly have respective right-hand and left-hand screw-threaded connections 52 and 53 with respective sleeves 54 and 55 surrounding the rings, the sleeves being rotatably mounted in the hollow shaft 33 and being confined in the shaft against axial movement. At their adjacent ends the two sleeves of each chuck assembly carry respective internal ring gears 56 and are spaced by a peripheral projection or flange 57 on the jaw spacing ring 43, the projection being flanked by thrust washers 58. The inner end of each inner sleeve 55 bears against a thrust washer 59, and the outer end of each outer sleeve has an outturned flange 60 bearing against the end of the tubular shaft 33. The chuck assembly at one end of the shaft is held in the shaft by a retainer ring 61 secured to the shaft, and the other chuck assembly is retained in place by the outturned flange 36 of the gage member 35. The two ring gears 56 of each chuck assembly mesh with pinions 62 carried on a number of shafts 63 which are journalled in the two associated wedge rings 48 and 49 and are seated in radial slots or notches 64 formed in the intervening jaw-guiding ring 43, the shafts extending parallel to the shaft axis and being spaced around the wedge rings. The pinions 62 are integral with or fast on the shaft 63 and are axially confined in recesses 65 formed in the jaw-spacing ring 43. At their outer ends the pinion shafts 63 have squared wrench-receiving portions 66. By turning the pinion shafts the screw-threaded sleeves 54 and 55 are rotated relatively to the wedge rings 48 and 49, thus moving the wedge rings axially toward or away from each other to tighten or loosen the chuck jaws 34 with respect to the work piece. The jaw-spacing ring 43 and the wedge rings 48 and 49 are preferably retained against relative rotation with respect to the hollow shaft 33. The chuck jaws 34 are confined against axial movement by the spacing rings 43, thus preventing axial shifting of the work piece during tightening of the jaws.

One or more blocks 67 are rigidly secured to the intermediate portion of the hollow shaft 33 at the inner side thereof, as by screws 68, and carry rollers 69 to support the work piece during its insertion into the chuck and its removal therefrom. Preferably, a plurality of the roller-carrying blocks are peripherally spaced within the shaft. The work piece is further supported during this manipulation by a saddle-type roller 70 which is mounted on a bracket 71 secured to the lower portion of the housing 26, the roller having an eccentric adjustment 72 to vary its elevation. The rollers 69 and 70 which support the work piece at axially spaced regions not only permit easy movement of the work piece but also avoid wear or scoring of the work piece and chuck jaws.

An external ring gear 73 is keyed to the intermediate portion of the hollow shaft 33 and comprises two axially spaced gear sections 74 and 75 forming in effect a herringbone gear. The ring gear is held against a shouldered portion 33' of the shaft by wedge blocks 76 and is axially confined between the shouldered portion 33' and the wedge blocks. Each wedge block 76 engages in a slant-sided groove or recess 76' formed in the outer periphery of the shaft and is secured therein by a radially extending screw 76''. A pinion shaft 77 is journalled in the chuck housing in parallel relation to the hollow shaft 33 and carries pinions 78 and 79 meshing with the gear sections 74 and 75 respectively, the pinion 79 being axially shiftable on the shaft 77 to take up back-lash and being retained between adjustable clamping nuts 80. The pinion shaft 77 is driven through adjustable-speed gearing connections of any suitable type from an electric motor 81 mounted on the chuck housing. The motor is here shown to have a belt drive connection 81' with a countershaft 82, and the gearing connection further includes a shaft 83, Fig. 3, having a shiftable change-speed gear 84 and having a pinion 85 meshing with the pinion 78 on the shaft 77.

The ring gear section 74 also meshes with a pinion 152 on a shaft 151 journalled in the chuck housing, the shaft 151 serving to drive other parts of the machine such as controlling means for the boring heads.

Figure 2:
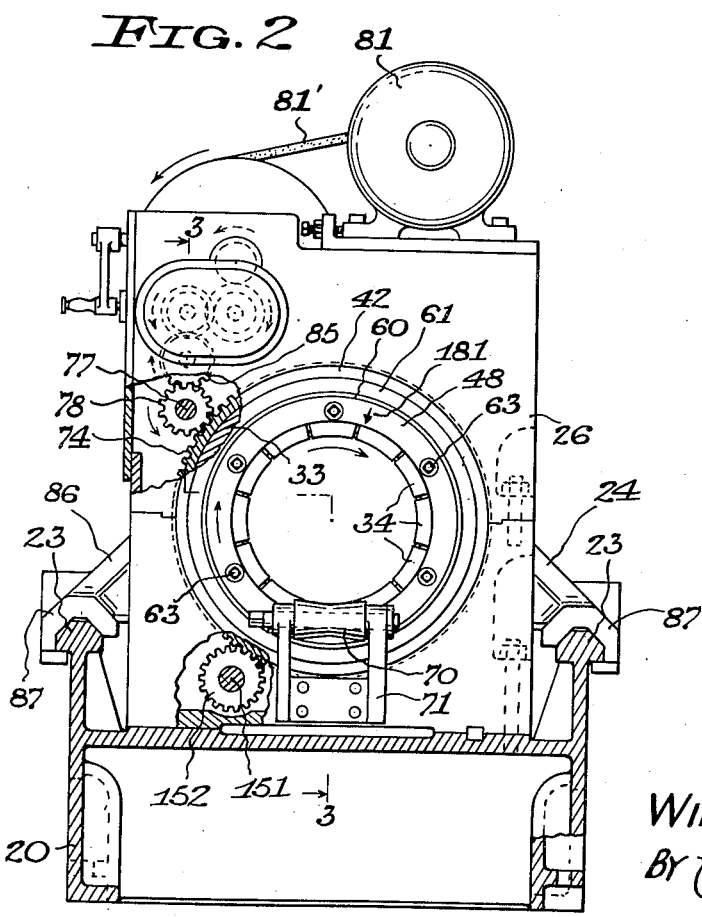
Fig. 2 is a transverse sectional elevation of the machine taken generally along the line 2—2 of Fig. 1.

In operation, the work piece W is inserted into the chucking means of the housing 26 while the chucking means is stationary and while the boring heads 24 and 25 are in their retracted positions, as seen in Fig. 1. During this insertion the work piece rolls along the saddle-shaped guide roller 70 and along the inner guide rollers 69, and finally engages the gage member 35. For some types of work, it is necessary to have the work piece properly oriented in the chucking means, and for this purpose the rotatable work carrier has a suitable index mark 181, Fig. 2. The two sets of chuck jaws are then contracted into driving engagement with the finished exterior walls of the work piece by turning one or more of the pinion shafts 63 of each chuck assembly, this manipulation centering the work piece with respect to the axis of the hollow shaft 33 and spacing the work piece from the guide rollers 69 and 70. The numerous chuck jaws have a well distributed engagement with the cylindrical periphery of the work piece, thus providing a relatively large frictional clamping area and avoiding marring or distortion of the walls of the tubular work piece.

After the work piece is clamped, the chucking means is rotated by the motor 81 through the transmission gearing. The opposed boring heads 24 and 25 are advanced into the rotating work piece on one or more cutting strokes and are retracted after the cutting operation. Upon completion of the cutting operation the chucking means is stopped and the chuck jaws are released, whereupon the work piece is withdrawn axially from the chucking means, the work piece riding on the rollers 69 and 70.

This application constitutes a division of application Serial No. 458,839, filed September 18, 1942, now Patent No. 2,424,524, issued July 22, 1947.

What I claim as new and desire to secure by Letters Patent is:

1. In combination, an annular series of contractible article-clamping jaws having tapered outer surfaces, means for preventing axial shifting of said jaws, a wedge ring surrounding said series of jaws and engaging said tapered surfaces, means for supporting said wedge ring, and means for axially shifting said wedge ring to contract said jaws, said last named means including an actuating shaft journalled in said wedge ring.

2. In combination, a hollow support, a sleeve rotatably mounted in said support and having an internal ring gear, a wedge ring extending in said sleeve and having a screw-threaded engagement with said sleeve, an annular series of article-clamping jaws having tapered outer surfaces slidably engageable with said wedge ring to effect contraction of said jaws, and a shaft journalled in said wedge ring and having a gear meshing with said ring gear for relatively rotating said sleeve and wedge ring to effect relative axial displacement of said wedge ring and jaws.

3. In combination, two coaxial annular series of contractible article-clamping jaws having tapered outer surfaces, said tapered surfaces being arranged in opposed relation, means including a guide ring for retaining said two series of jaws against relative axial displacement while permitting their radial displacement, opposed wedge rings engageable with the tapered surfaces of the jaws, a pair of sleeves surrounding and supporting said wedge rings and having respective screw-threaded connections with the associated wedge rings, and means for axially displacing said wedge rings with respect to each other to contract said jaws, said last-named means including a shaft journalled in said wedge rings and having gears meshing with said respective sleeve gears, said shaft having an axial engagement with said guide ring to resist axial displacement of said shaft in both directions.

4. In combination, a hollow rotatable member adapted to receive an article therein, article-clamping means carried by said member and including axially spaced clamping members, and roller means carried by said rotatable means for rollably supporting the article during its insertion and removal and disposed between said clamping members.

WILLIAM H. WEIMER.

REFERENCES CITED

The following references are of record in the file of this patent:

UNITED STATES PATENTS

| Number | Name | Date |
|---|---|---|
| 836,487 | Crone | Nov. 20, 1906 |
| 955,572 | Rowe | June 20, 1911 |
| 1,159,247 | Morrow | Nov. 2, 1915 |
| 1,312,628 | Gycksen | Aug. 12, 1919 |
| 1,392,109 | Bisset | Sept. 27, 1921 |
| 1,571,331 | Hagman | Feb. 2, 1926 |
| 1,697,532 | Lilleberg | Jan. 1, 1929 |
| 1,767,836 | Davis | June 24, 1930 |
| 2,333,180 | Holmes | Nov. 2, 1943 |
| 2,365,116 | Sloan | Dec. 12, 1944 |
| 2,372,592 | Lovely | Mar. 27, 1945 |

FOREIGN PATENTS

| Number | Country | Date |
|---|---|---|
| 22,842 | Great Britain | of 1904 |
| 105,337 | Great Britain | of 1917 |

Certificate of Correction

Patent No. 2,529,205 November 7, 1950

WILLIAM H. WEIMER

It is hereby certified that error appears in the printed specification of the above numbered patent requiring correction as follows:

Column 6, line 8, for the word "means", second occurrence, read *member*; line 21, list of references cited, for the patent number "955,572" read *995,572*; line 23, name of patentee, for "Gycksen" read *Gydesen*;

and that the said Letters Patent should be read as corrected above, so that the same may conform to the record of the case in the Patent Office.

Signed and sealed this 9th day of January, A. D. 1951.

[SEAL]

THOMAS F. MURPHY,
*Assistant Commissioner of Patents.*